United States Patent [19]
Mori et al.

[11] Patent Number: 5,717,674
[45] Date of Patent: Feb. 10, 1998

[54] THREE-BEAM GENERATING DIFFRACTION GRATING, TRANSMISSION TYPE HOLOGRAPHIC OPTICAL ELEMENT AND OPTICAL PICKUP APPARATUS USING THE SAME

[75] Inventors: Kazushi Mori, Hirakata; Atsushi Tajiri, Mishima-gun; Yasuaki Inoue, Nagaokakyo, all of Japan

[73] Assignee: Sanyo Electrics Co., Ltd., Moriguchi, Japan

[21] Appl. No.: 671,197

[22] Filed: Jun. 27, 1996

[30]  Foreign Application Priority Data

Jun. 30, 1995 [JP] Japan ................................. 7-166166
May 14, 1996 [JP] Japan ................................. 8-118871
Jun. 19, 1996 [JP] Japan ................................. 8-158262

[51] Int. Cl.$^6$ ........................................... G11B 7/00
[52] U.S. Cl. ......................... 369/103; 369/109; 369/112; 369/44.12; 359/562
[58] Field of Search ........................... 369/112, 109, 369/103, 100, 44.11, 44.12, 44.14; 359/562, 569, 573

[56]  References Cited

U.S. PATENT DOCUMENTS

| | | | |
|---|---|---|---|
| 4,731,772 | 3/1988 | Lee ........................................... | 369/45 |
| 5,018,804 | 5/1991 | Jung et al. ................................ | 350/3.71 |
| 5,412,631 | 5/1995 | Komma et al. .......................... | 369/103 X |
| 5,446,719 | 8/1995 | Yoshida et al. ......................... | 369/116 |
| 5,475,670 | 12/1995 | Hamada et al. ....................... | 369/103 X |
| 5,594,713 | 1/1997 | Komma et al. ........................ | 369/103 X |

(List continued on next page.)

FOREIGN PATENT DOCUMENTS

| | | |
|---|---|---|
| 3-76035 | 4/1991 | Japan . |
| 7-3700 | 1/1995 | Japan . |
| 7-161065 | 6/1995 | Japan . |
| 7-192299 | 7/1995 | Japan . |

OTHER PUBLICATIONS

U.S. Ser. No. 08/259,673, filed Jun. 13, 1994.
U.S. Ser. No. 08/508,368, filed Jul. 28, 1995.
Extended Abstracts (The 43rd Spring Meeting, 1996); The Japan Society of Applied Physics and Related Societies No. 3, p. 1084.
Komma et al.; *Duel Focus Optical Head for 0.6mm and 1.2mm Disks*; Optical Data Storage (ODS) 1994; p. 116/WB5-1.

(List continued on next page.)

*Primary Examiner*—Muhammad N. Edun
*Attorney, Agent, or Firm*—Armstrong, Westerman Hattori, McLeland & Naughton

[57] ABSTRACT

An optical pickup apparatus includes a semiconductor laser generating a light having a short wavelength for reproduction of a high-density information recording medium and a semiconductor laser outputting a light for reproduction of an information recording medium with low recording density. A three-beam generating diffraction grating, a transmission type holographic optical element and a condenser lens are disposed in the light path in which the laser lights from the semiconductor lasers propagate toward the recording surface of an information recording medium. The laser light emitted from each semiconductor laser is transmitted through the three-beam generating diffraction grating and divided into three beams and then transmitted through the transmission type holographic optical element and passed through the condenser lens to reach the recording surface of the information recording medium. The transmission type holographic optical element is formed so that the product of the diffraction efficiency of the laser light in the forward optical path and the separated diffraction efficiency of the returned light increases as the wavelength of the laser light decreases. The three-beam generating diffraction grating has grooves with such depth that the diffraction efficiency of the main beam in the three-divided beams is smaller and the diffraction efficiency of the sub-beams is larger as the wavelength of the laser light is shorter.

27 Claims, 10 Drawing Sheets

OTHER PUBLICATIONS

Lee; *Holographic Optical Head for Compact Disk Applications*; Optical Engineering; Jun. 1989, vol. 28, No. 6; pp. 650–653.

Lee et al.; *Optical Pickup for Compact Disc Player Using Computer–Generated Hologram and Reflection–Type Grating*; Jpn. J. Appl. Phys.; vol. 32 (1993), Part 1, No. 11B, Nov. 1993; pp. 5451–5452.

DIRECTION OF −1st ORDER(OR +1st ORDER) DIFFRACTION

DIRECTION OF +1st ORDER(OR −1st ORDER) DIFFRACTION

THREE-BEAM GENERATING DIFFRACTION GRATING, TRANSMISSION TYPE HOLOGRAPHIC OPTICAL ELEMENT AND OPTICAL PICKUP APPARATUS USING THE SAME

BACKGROUND OF THE INVENTION

1. Field of the invention

The present invention relates to a three-beam generating diffraction grating, a transmission type holographic optical element and an optical pickup apparatus.

2. Description of the Background Art

Recently, optical pickup apparatuses adapted for various kinds of information recording media have been studied and developed.

FIG. 12 is a structural diagram of an optical pickup apparatus which performs focusing servo using the astigmatism method and tracking servo using the three-beam method disclosed in Japanese Patent Laying-Open No.3-76035 (G11B 7/135).

As shown in FIG. 12, the optical pickup apparatus includes a semiconductor laser 102 for outputting a laser light (beam) upward, a three-beam generating diffraction grating 103 for dividing the beam into three beams, a holographic optical element 104 for transmitting the three beams, and diffracting the returned beams (reflected beams) from the disk 101 and introducing astigmatism corresponding to the focusing condition to the returned beams, a condenser lens 105 for condensing the three beams transmitted through the holographic optical element 104 onto the disk 101 as three spots, and a photodetector 106 for detecting the returned beams from the disk 101 which were diffracted at the holographic optical element 104.

In the optical pickup apparatus above, however, the various optical elements including the light source are set to reproduce information on a particular information recording medium, e.g., a CD (Compact Disk). Therefore, this optical pickup apparatus has the problem that it can not reproduce information on an information recording medium based on another standard with different recording density such as track density (track pitch), a DVD (Digital Video Disk), for example.

In order to solve the problem, the method is proposed which enables reproduction both of an information recording medium with large recording density and an information recording medium with small recording density by using a light source outputting a short wavelength light corresponding to the information recording medium with large recording density and some additional optical system.

However, generally, the smaller the oscillation wavelength of a light source is, the shorter its lifetime becomes. Hence, if such a light source as outputs a short wavelength light is used not only for an information recording medium with large recording density but also for an information recording medium with small recording density, the lifetime of the light source will be shortened. This results in the problem that the lifetime of the optical pickup apparatus is also shortened.

SUMMARY OF THE INVENTION

The inventors paid attention to an optical pickup apparatus having two light sources corresponding to recording densities of information recording media. The inventors then studied an optical pickup apparatus that as the second light source a semiconductor laser outputting a short wavelength light which can form a small focused spot to reproduce information from a high-density information recording medium is provided with an ordinary apparatus for CD.

However, the use of a semiconductor laser outputting a short wavelength light which can form a small focused spot for reproduction of a high-density information recording medium as a light source of an ordinary optical pickup apparatus may cause inferior tracking servo in reproduction of an information recording medium with larger track density (i.e., with narrower track pitch) than the CD. Furthermore, as shown in FIG. 13, the light-receiving sensitivity of a generally used photodetector composed of an Si semiconductor deteriorates with a decrease in wavelength. Accordingly, there is a possibility that the short wavelength light can not be sensitively detected when a photodetector composed of an Si semiconductor is used.

An object of the present invention is to provide a tree-beam generating diffraction grating enabling good tracking servo to information recording media with different track densities.

Another object of the present invention is to provide an optical pickup apparatus which can apply good tracking servo to information recording media with different track densities.

Still another object of the present invention is to provide a holographic optical element which can efficiently utilize short wavelength light.

Still another object of the present invention is to provide an optical pickup apparatus capable of reproduction of information recording media with different recording densities and efficient detection of short wavelength light.

A three-beam generating diffraction grating according to the present invention is a three-beam generating diffraction grating which divides an incident beam at least into a main beam and two sub-beams placed on both sides of the main beam, which has the property that a diffraction efficiency of the main beam becomes smaller and a diffraction efficiency of the sub-beams becomes larger as a wavelength of the incident beam becomes shorter.

Particularly, it is preferred that the main beam is a 0th order diffraction light and the two sub-beams are a 1st order diffraction light and a −1st order diffraction light.

A grating surface of the three-beam generating diffraction grating may have a plurality of grooves having a depth set so that the diffraction efficiency of the main beam becomes smaller and the diffraction efficiency of the sub-beams becomes larger as the wavelength of the incident beam becomes shorter.

Particularly, the three-beam generating diffraction grating has the property that a diffraction efficiency of the main beam becomes smaller and a diffraction efficiency of the sub-beam becomes larger in the case where the wavelength of the incident beam is approximately between 620 and 660 nm than in the case where the wavelength of the incident beam is approximately between 765 and 800 nm.

An optical pickup apparatus according to another aspect of the present invention includes a plurality of light sources which emit beams having wavelengths respectively corresponding to a plurality of information recording media with different kinds of track densities and a three-beam generating diffraction grating provided in common for the plurality of light sources for dividing the beam emitted from each of the plurality of light sources at least into three beams including a main beam and two sub-beams for tracking servo located on both sides of the main beam, wherein the three-beam generating diffraction grating has the property that a diffraction efficiency of the divided main beam becomes smaller and a diffraction efficiency of the divided sub-beams becomes larger as the wavelength of the incident beam becomes shorter.

In the three-beam generating diffraction grating according to the present invention, the shorter the wavelength of the incident beam is, the smaller the diffraction efficiency of the main beam becomes and the larger the diffraction grating of the sub-beams becomes. Therefore, in the three focused spots of these beams focused onto the information recording medium, the intensity of the focused spot of the sub-beam (sub-spot) with respect to the focused spot of the main beam (main spot) becomes larger as the wavelength of the beam becomes shorter.

Since an information recording medium with larger track density has smaller track pitch (track width), the area of the region where the sub-spot covers the track is smaller. However, the intensity of the sub-spot is made larger as transmitted through the three-beam generating diffraction grating above, which allows tracking servo with sub-spots having larger intensity to be applied to an information recording medium with higher track density. This reduces the ratio of noise components included in the tracking error signal, and then good tracking servo can be applied also to the information recording media with higher track density.

On the other hand, an information recording medium with small track density undergoes tracking servo with a beam having a long wavelength. When the long wavelength beam is transmitted through the above three-beam generating diffraction grating, the intensity of the sub-spot becomes smaller, but the sub-spot covers the track in a large area because this information recording medium has a large track pitch (track width). Accordingly, good tracking servo can be applied also to information recording media with small track density.

The optical pickup apparatus according to the present invention may further include a transmission type holographic optical element common to the plurality of light sources, which is disposed between the three-beam generating diffraction grating and an information recording medium in forward optical paths from the plurality of light sources for obtaining from a returned beam from the information recording medium a separated diffraction beam separated from corresponding one of the forward optical paths and a photodetector for detecting the separated diffraction beam given off from the transmission type holographic optical element, wherein the transmission type holographic optical element may have the property that a product of a diffraction efficiency for a beam transmitted through the transmission type holographic optical element in the forward optical path and a diffraction efficiency for the separated diffraction beam becomes larger as the wavelength of the light incident in the forward optical path becomes shorter.

The optical pickup apparatus may further include a collector for collecting the three beams given off from the three-beam generating diffraction grating onto the information recording medium, a separator for transmitting the three beams and separating from the three beams returned beams from the information recording medium, and a photodetector for detecting the returned beams given off from the separator.

The optical pickup apparatus may further include an optical element disposed in forward optical paths between the light sources and the collector, wherein the three-beam generating diffraction grating and the separator are formed on planes facing each other in the optical element. In this case, since the relative position of the diffraction grating and the separator can be accurately set, the optical adjustment can be simplified.

Particularly, the main beam divided by the three-beam generating diffraction grating of the optical pickup apparatus may be a 0th order diffraction light and the two sub-beams may be a 1st order diffraction light and a −1st order diffraction light. In this case, since a light intensity ratio of the main beam and the sub-beams can be suitably controlled, more excellent tracking servo can be achieved.

A grating surface of the three-beam generating diffraction grating may have a plurality of grooves having a depth set so that the diffraction efficiency of the divided main beam becomes smaller and the diffraction efficiency of the divided sub-beams becomes larger the wavelength of the incident beam becomes shorter.

Such a diffraction grating provides easy fabrication by using photolithography and etching and accurate adjustment of the depth of the grooves i.e., the diffraction efficiency.

Particularly, the plurality of light sources includes a first light source which emits a light having a first wavelength for reproduction of a first information recording medium and a second light source which emits a light having a second wavelength longer than that of the first wavelength for reproduction of a second information recording medium with a lower recording density than the first information recording medium, and the three-beam generating diffraction grating has the property that a diffraction efficiency of the main beam becomes smaller and a diffraction efficiency of the sub-beams becomes larger in the case of the first wavelength than in the case of the second wavelength.

Particularly, the first light source is a semiconductor laser which emits a beam having a wavelength approximately between 620 and 660 nm and the second light source is a semiconductor laser which emits a beam having a wavelength approximately between 765 and 800 nm. This allows reproduction of information with excellent tracking servo from a CD and an information recording medium with track density about 1.5 to 3 times that of the CD.

Particularly, the three-beam generating diffraction grating may be a transmission type three-beam generating diffraction grating or a reflection type three-beam generating diffraction grating.

A transmission type holographic optical element according to another aspect of the present invention is a transmission type holographic optical element used to obtain a separated diffraction beam in a first diffraction order separated from an incident beam, which has the property that a product of a diffraction efficiency for the separated diffraction beam in the first diffraction order and a diffraction efficiency for a diffraction beam in a second diffraction order different from the diffraction order of the separated diffraction beam becomes larger as a wavelength of the incident beam becomes shorter.

It is preferred that the separated diffraction beam is a 1st order diffraction beam or a −1st order diffraction beam and the diffraction beam of the second diffraction order is a 0th order diffraction beam.

Particularly, the holographic functional surface of the transmission type holographic optical element may have a plurality of grooves having a depth set so that the product of the diffraction efficiency for the separated diffraction beam and the diffraction efficiency for the diffraction beam in the second diffraction order becomes larger as the wavelength of the incident beam becomes shorter.

Particularly, the transmission type holographic optical element may have the property that the product of the diffraction efficiency for the separated diffraction beam and the diffraction efficiency for the diffraction beam in the second diffraction order in the case where the wavelength of the incident beam is approximately between 620 and 660 nm is larger than the product of the diffraction efficiency for the separated diffraction beam and the diffraction efficiency for the diffraction beam in the second diffraction order in the case where the wavelength of the incident beam is approximately between 765 and 800 nm.

An optical pickup apparatus according to another aspect of the present invention is an optical pickup apparatus capable of reproduction of a plurality of different information recording media, which includes a plurality of light sources for emitting lights having wavelengths respectively corresponding to the plurality of information recording media having different recording densities, and a transmission type holographic optical element common to the plurality of light sources, which is disposed in a forward optical path from the plurality of light sources for obtaining from a returned beam from the information recording medium a separated diffraction beam separated from the corresponding forward optical path, wherein the transmission type holographic optical element has the property that a product of a diffraction efficiency for a beam transmitted through the holographic optical element in the forward optical path and a diffraction efficiency for the separated diffraction beam becomes larger as a wavelength of a incident light in the forward optical path becomes shorter.

By using the transmission type holographic optical element of the present invention, the utilization efficiency of the beam transmitted through the transmission type holographic optical element can be enhanced in reproduction of an information recording medium with a short wavelength light. This suppresses a decrease in intensity of the beam incident upon the photodetector so as to enhance the light detecting efficiency of the optical pickup apparatus.

The optical pickup apparatus may further include a three-beam generating diffraction grating common to the plurality of light sources disposed in the forward optical paths between the plurality of light sources and the transmission type holographic optical element for dividing the beam emitted from each of said plurality of light sources at least into three beams including a main beam and two sub-beams for tracking servo placed on both sides of said main beam, wherein the three-beam generating diffraction grating may have the property that a diffraction efficiency of the divided main beam becomes smaller and a diffraction efficiency of the divided sub-beams becomes larger as the wavelength of the incident beam becomes shorter.

The optical pickup apparatus of the present invention may further include a three-beam generating diffraction grating between the plurality of light sources and the holographic optical element in the forward optical path.

The transmission type holographic optical element and the three-beam generating diffraction grating may be integrally formed of a light-transmitting member, the light-transmitting member having a holographic functional surface and a three-beam generating diffraction grating surface facing each other, the three-beam generating diffraction grating surface being disposed on the side of the plurality of light sources. This allows the relative position of the holographic optical element and the diffraction grating to be set accurately, which simplifies the optical adjustment.

Particularly, it is preferred that the beam passing through the transmission type holographic optical element in the forward optical path is a 0th order diffraction light and the separated diffraction beam is a 1st order diffraction light or a −1st order diffraction light.

Particularly, the plurality of light sources may include a first light source which emits a light having a first wavelength for reproduction of a first information recording medium and a second light source which emits a light having a second wavelength longer than the first wavelength for reproduction of a second information recording medium with a lower recording density than that of the first information recording medium, and the transmission type holographic optical element may have the property that a product of a diffraction efficiency for a beam which is the light emitted from the first light source and transmitted through the transmission type holographic optical element in the forward optical path and a diffraction efficiency for a separated diffraction beam separated from the corresponding forward optical path obtained from a returned beam from the first information recording medium is larger than a product of a diffraction efficiency for a beam which is the light emitted from the second light source and transmitted through the transmission type holographic optical element in the forward optical path and a diffraction efficiency for a separated diffraction beam separated from the corresponding forward optical path obtained from a returned beam from the second information recording medium. Particularly, it is preferred that the groove depth of this hologram surface is set so that the utilization efficiency of the beam from the first light source is at or near the first maximal value.

Particularly, the first light source may be a semiconductor laser which emits a light having a wavelength approximately between 620 and 660 nm and the second light source may be a semiconductor laser which emits a light having a wavelength approximately between 765 and 800 nm. In this case, the first light source is used for reproduction of an information recording medium with high density, such as DVD, and the second light source is used for reproduction of a CD, for example. This allows good reproduction of the plurality of information recording media with different recording densities (e.g., CD and DVD).

The optical pickup apparatus may further include a collector for collecting each of the beams emitted from the plurality of light sources onto corresponding one of the information recording media between the transmission type holographic optical element and the plurality of information recording media and at least one detector for detecting the separated diffraction beam given off from the transmission type holographic optical element.

In the optical pickup apparatus of the present invention, since the reproduction light with a shorter wavelength has a smaller attenuation rate in the transmission type holographic optical element, a reduction in intensity of the returned light of the shorter wavelength reproduction light from the information recording medium can be suppressed. Accordingly, even when an Si system photodetector is used, information on an information recording medium with larger recording density can be excellently reproduced with a short wavelength reproduction light. Furthermore, while the returned light of a long wavelength reproduction light from the information recording medium has a larger attenuation rate than the short wavelength reproduction light, the Si system photodetector has high sensitivity on the long wavelength side. Hence, good reproduction can be achieved also with an information recording medium with small recording density for reproduction with long wavelength light.

Particularly, a holographic function surface of the transmission type holographic optical element may have a plurality of grooves having a depth set so that a product of a diffraction efficiency for a beam transmitted through the transmission type holographic optical element in the forward optical path and a diffraction efficiency for the separated diffraction beam becomes larger as the wavelength of the light incident in the forward optical path becomes shorter.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
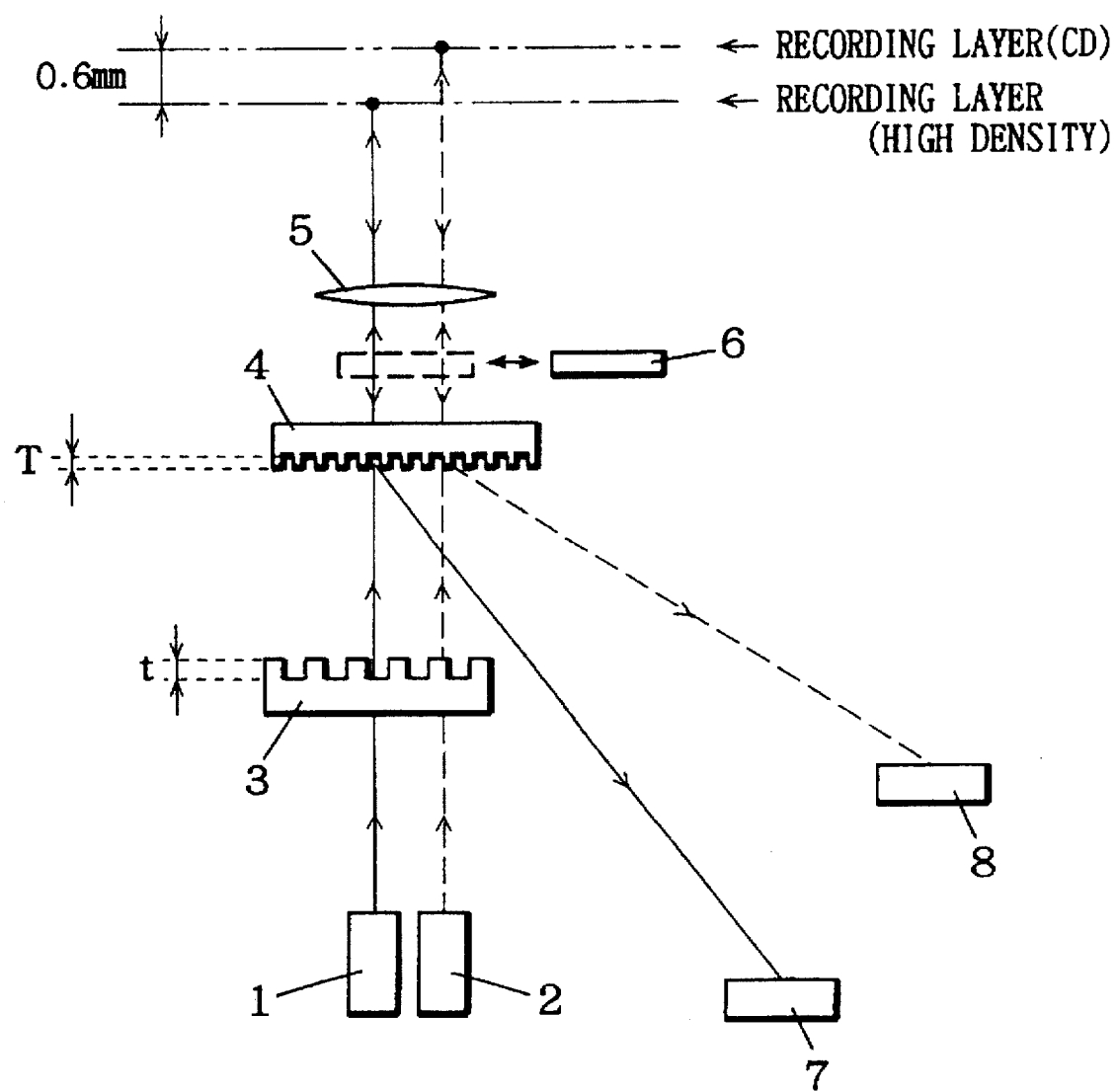
FIG. 1 is a schematic structural diagram of an optical pickup apparatus according to an embodiment of the present invention.

The optical pickup apparatus shown in FIG. 1 includes two light sources and performs focusing servo using the astigmatism method and tracking servo using the three-beam method to reproduce information on two information recording media with different recording densities. For example, the information recording media which undergo the processing are a CD (Compact Disk) and a DVD (high-density information recording medium). The CD is formed such that the distance from the incidence surface (the transparent substrate surface on the side upon which the reproduction light impinges) to the reflection surface (the surface in which information is recorded) is 1.2 mm, which is reproduced with a laser light having a wavelength of 780 nm. The DVD is formed such that the distance from the incidence surface (the transparent substrate surface on which the reproduction light is incident) to the reflection surface (the surface on which information is recorded) is 0.6 mm, which is reproduced with a laser light having a wavelength of 635 nm. The track pitch of the DVD is about half that of the CD (pitch=1.6 μm), where information is recorded with higher density than in the CD.

In the structure of the optical pickup apparatus shown in FIG. 1, the three-beam generating diffraction grating 3, the transmission type holographic optical element 4 and the condenser lens 5 are used in common for reproduction of the CD and the DVD, the semiconductor laser 1 and the six-segment photodetector 7 are used only for reproduction of the DVD and the semiconductor laser 2, the correction lens 6, and the six-segment photodetector 8 are used only for reproduction of the CD.

The semiconductor laser 1 for DVD reproduction outputs a laser light at a wavelength of 635 nm. The semiconductor laser 2 for CD reproduction disposed near the semiconductor laser 1 outputs a laser light at a wavelength of 780 nm.

The three-beam generating diffraction grating 3 is disposed above the semiconductor lasers 1 and 2. The three-beam generating diffraction grating 3 is a so-called transmission type diffraction grating composed of a light-transmitting material such as optical glass or optical resin, which is composed of quartz glass, for example. It has a three-beam generating diffraction grating surface formed of a linear grating with equal interval of 20 μm cycle, which divides the laser light (the first beam, the second beam) emitted from the semiconductor laser 1, 2 at least into three beams, the 0th order diffraction light (main beam) and the ±1st order diffraction lights (sub-beams). In FIG. 1, the three beams are depicted by a single line.

Figure 2:
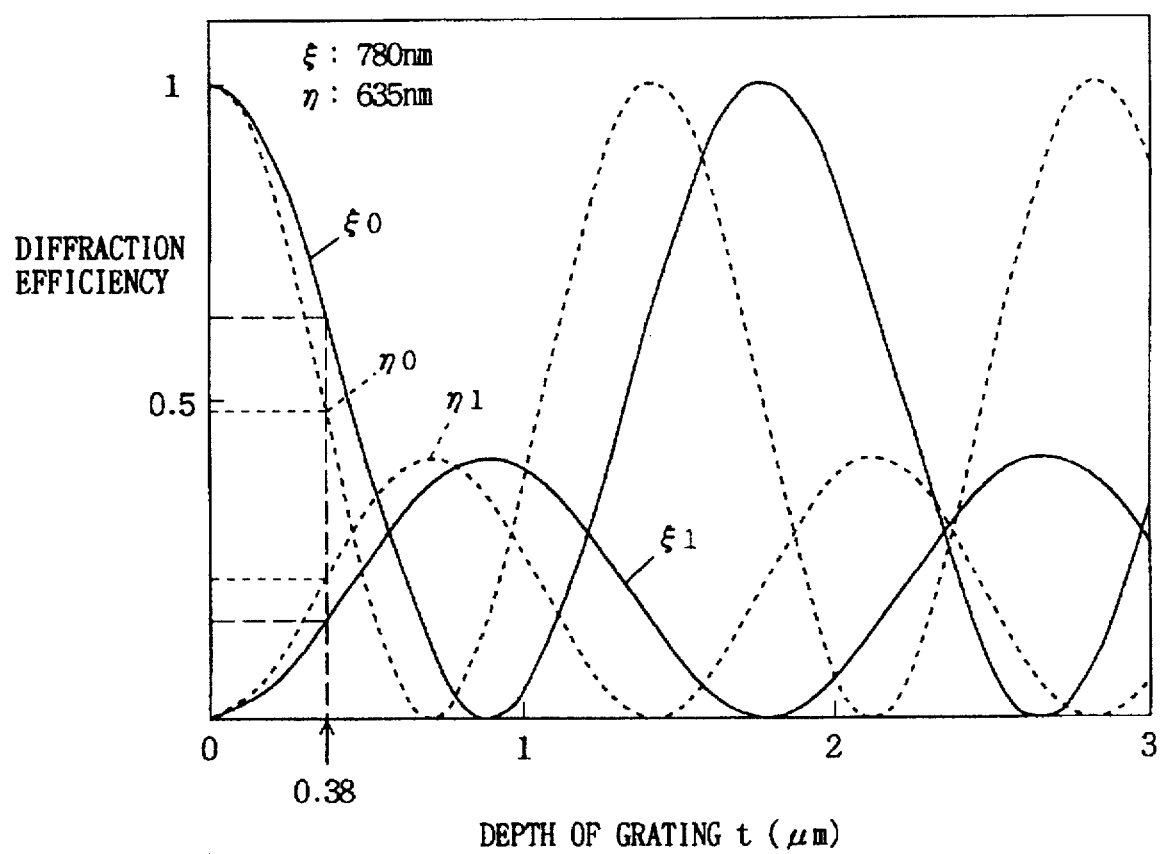
FIG. 2 is a diagram showing the relation of the diffraction efficiencies of the light with a wavelength of 780 nm and the light with a wavelength of 635 nm with respect to the grating depth t of the three-beam generating diffraction grating.

In FIG. 2, $\eta_0$, $\eta_1$ respectively indicate the diffraction efficiencies of the 0th order diffraction light and the ±1st order diffraction lights for the laser light of wavelength 635 nm through the three-beam generating diffraction grating 3, and $\xi_0$, $\xi_1$ respectively indicate the diffraction efficiencies of the 0th order diffraction light and the ±1st order diffraction lights for the laser light of wavelength 780 nm through the three-beam generating diffraction grating 3. As shown in FIG. 2, the diffraction efficiencies of the 0th order diffraction light and the ±1st order diffraction lights produced by the three-beam generating diffraction grating 3 periodically change with respect to the depth t of the grooves of the grating formed in the three-beam generating diffraction grating surface. The cycles of the variations of the diffraction efficiencies differ according to the wavelengths of the diffraction lights.

Hence, the three-beam generating diffraction grating 3 of this embodiment is designed so that the diffraction efficiency of the main beam decreases and the diffraction efficiency of the sub-beams increases as the wavelength of the incident light decreases. For example, the groove depth t of the diffraction grating is formed to about 0.38 μm. Then, the diffraction efficiency of the 0th order diffraction light for the laser light of wavelength 635 nm is about 0.48 and the diffraction efficiency of the 0th order diffraction light for the laser light of wavelength 780 nm is about 0.63, which shows that the diffraction efficiency of the 0th order diffraction light for the shorter wavelength is smaller.

The diffraction efficiency of the ±1st order diffraction lights for the laser light of wavelength 635 nm is about 0.22 and the diffraction efficiency of the ±1st order diffraction lights for the laser light of wavelength 780 nm is about 0.15. Thus, the diffraction efficiency for the shorter wavelength is larger.

As shown in FIG. 1, the transmission type holographic optical element 4 is disposed above the three-beam generating diffraction grating 3. The transmission type holographic optical element 4 transmits the three light beams (the main beam and the sub-beams) diffracted by the three-beam generating diffraction grating 3 onto the recording surface of the CD or DVD. It also obtains separated diffraction beams transmitted and diffracted in the 1st order while introducing spacial variation (astigmatism in this embodiment) corresponding to the focusing condition on the recording surface of the information recording medium to the reflected beams (returned beams) from the recording surface of the CD or DVD.

Figure 3:
FIG. 3 is a plan showing a holographic functional surface of the holographic optical element used in this embodiment.
Figure 3:
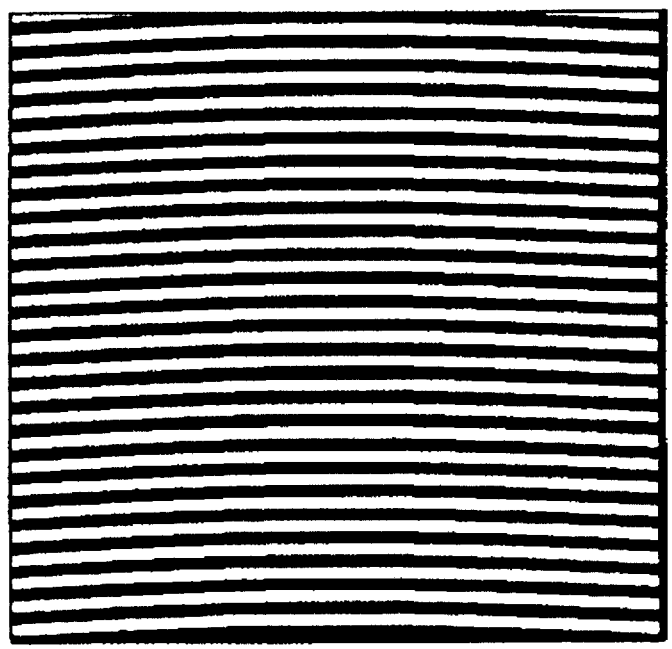
Figure 3:

The transmission type holographic optical element 4 performing such operation is composed of a light-transmitting material such as optical glass or optical resin, which has a holographic functional surface formed on the side facing to the three-beam generating diffraction grating 3. For example, a transmission type holographic optical element made of quartz glass has such a holographic functional surface as shown in FIG. 3. This holographic functional surface has a curve-like grating in which widths and pitches differ in the range of 2–4 μm according to positions in the holographic functional surface. The widths and pitches of the curve-like grating are determined depending on the positional relation between the semiconductor lasers 1, 2 as light sources and the corresponding six-segment photodetectors 7, 8.

Figure 4:
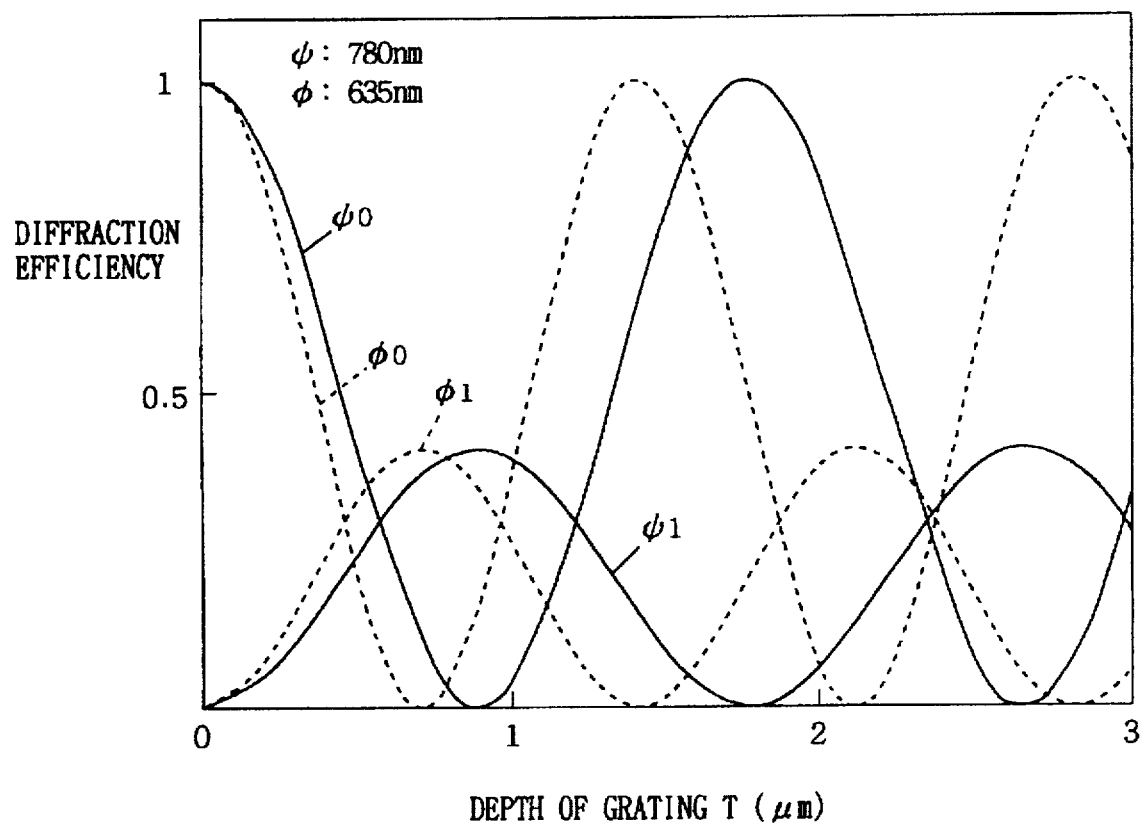
FIG. 4 is a diagram showing the relation of the diffraction efficiencies of the light with a wavelength of 780 nm and the light with a wavelength of 635 nm with respect to the grating depth T of the holographic optical element.

FIG. 4 shows the diffraction efficiencies of the diffraction lights produced by this transmission type holographic optical element 4. In FIG. 4, $\phi_0$ shows the diffraction efficiency of the 0th order diffraction light and $\phi_1$ shows that of the ±1st order diffraction lights for the light with a wavelength of 635 nm. The curve $\psi_0$ shows the diffraction efficiency of the 0th order diffraction light and $\psi_1$ shows that of the ±1st order diffraction lights for the light of a wavelength of 780 nm. As shown in the figure, the diffraction efficiencies of the 0th order and ±1st order diffraction lights periodically change with respect to the groove depth T of the grating of the holographic functional surface. The periodical change differs also according to the wavelength of the light.

The transmission type holographic optical element 4 of this embodiment transmits in the 0th order diffraction the three beams at a wavelength of 635 nm or the three beams at a wavelength of 780 nm transmitted through the three-beam generating diffraction grating 3 and also transmits in the 1st order diffraction the reflected beams (returned beams), reflected at the recording surface of the CD or the DVD and impinging thereon again, to direct the beams to the six-segment photodetectors 7, 8.

Figure 5:
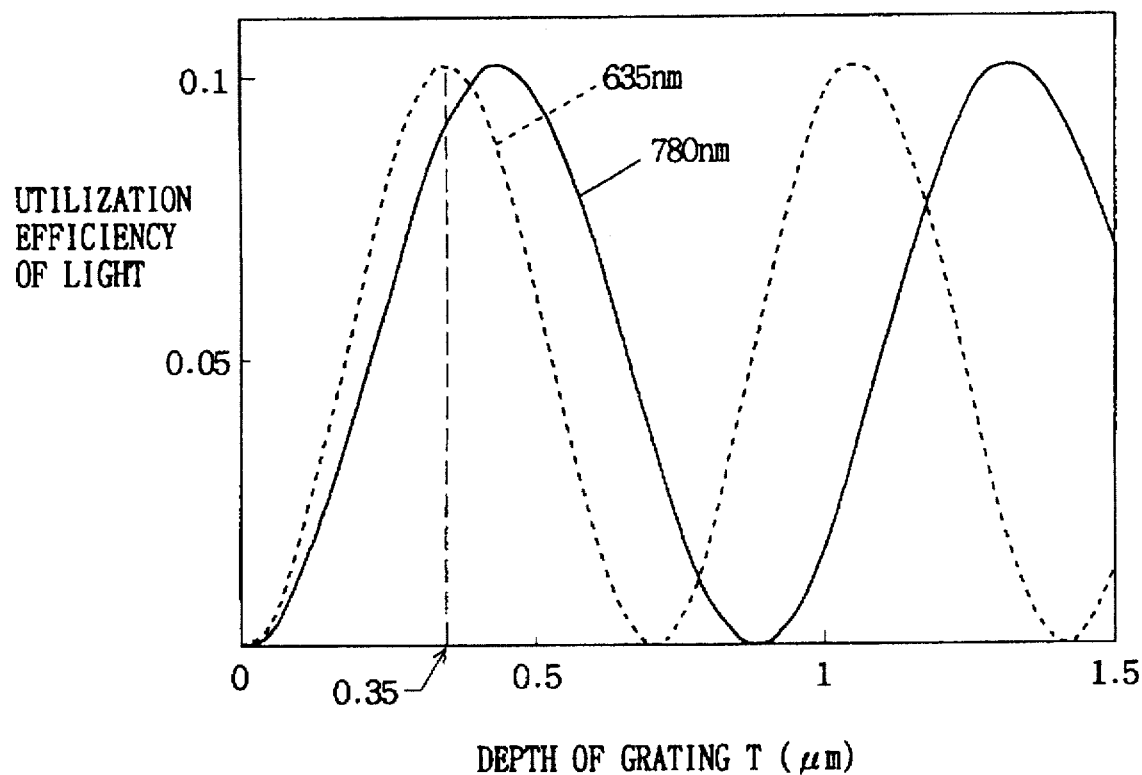
FIG. 5 is a diagram showing the relation of the utilization efficiencies of the light with a wavelength of 780 nm and the light with a wavelength of 635 nm with respect to the grating depth T of the holographic optical element.

Accordingly, the utilization efficiencies of the lights at wavelength 635 nm and wavelength 780 nm transmitted through the transmission type holographic optical element 4 are given as $\phi_0 \times \phi_1$, $\psi_0 \times \psi_1$, which are products of the diffraction efficiency of the 0th order diffraction light and the diffraction efficiency of the 1st order diffraction light shown in FIG. 4. The utilization efficiencies are shown in FIG. 5. In the transmission type holographic optical element 4 of this embodiment, the groove depth T of the grating of the holographic functional surface is selected so that the utilization efficiency for light with a short wavelength is higher than the utilization efficiency for light with a long wavelength. Specifically, the groove depth T of the grating is set to about 0.35 μl. In this case, as can be seen from FIG. 4, the diffraction efficiency of the holographic optical element 4 for the 0th order diffraction light of the light with wavelength 635 nm is about 0.49 and the diffraction efficiency of the ±1st order diffraction lights is about 0.21, and then the utilization efficiency in this case is, as shown in FIG. 5, about 0.10 (the maximum utilization efficiency: first maximal value). On the other hand, the diffraction efficiency of the holographic optical element 4 for the 0th order diffraction light of the light with wavelength 780 nm is about 0.64 and the diffraction efficiency of the ±1st order diffraction lights is about 0.14, and then the utilization efficiency of the light is about 0.09. Therefore, when the groove depth T is about 0.35 μm, the utilization efficiency of the short wavelength light is larger than the utilization efficiency of the long wavelength light.

Furthermore, as shown in FIG. 1, the condenser lens 5 for condensing the three beams transmitted through the transmission type holographic optical element 4 (the main beam and the sub-beams) onto the recording surface of the CD or the DVD to form focused spots is disposed above the transmission type holographic optical element 4.

Figure 6:
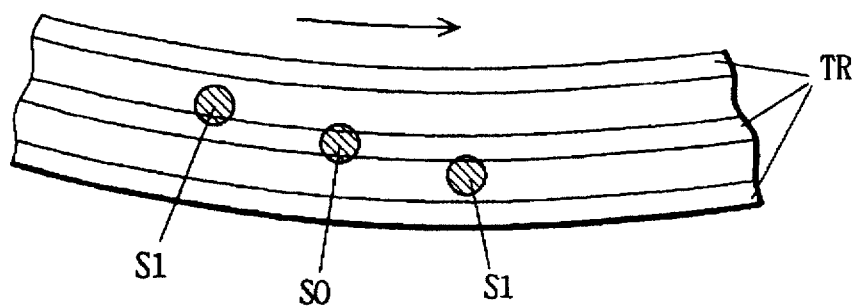
FIG. 6 is a schematic plan showing the positional relation among the track, the main spot and the sub-spots in the optical pickup apparatus of this embodiment.

The three beams condensed by the condenser lens 5 form three focused spots on the recording surface of the CD or the DVD as shown in FIG. 6. The focused spot of the main beam (the main spot S0) scans the track TR in which information is recorded, and the two focused spots of the sub-beams (the sub-spots S1) are placed on each side of the track TR which is scanned by the main spot S0 and perform scanning over the track TR and the non-track surface on each side of the track TR. The non-track surface has a larger light reflectance than the track surface. Accordingly, when the main-spot is off track, a difference is caused in intensity between the reflected lights from the two sub-spots on both sides because both sub-spots move to the same direction and the same distance as the main spot. Then, this change in intensity of the reflected lights is detected to perform control so that the main spot S0 just scans the track TR.

As shown in FIG. 1, the correction lens 6 is disposed in position only at the time of reproduction of a CD. The correction lens 6 is formed of, for example, a concave lens or a grating lens having function equivalent to the concave lens. The correction lens 6 stands by in the position outwardly apart from the space between the transmission type holographic optical element 4 and the condenser lens 5 in reproduction of the DVD, and it is moved by a driving device (not shown) into position between the transmission type holographic optical element 4 and the condenser lens 5 at the time of reproduction of the CD. This correction lens 6 corrects the condenser lens 5 so that the light of wavelength 780 nm is focused at 0.6 mm more distant position as compared with the light of wavelength 635 nm and the NA (Numerical Aperture) is reduced. Thus, the long wavelength light for CD is transmitted through the condenser lens 5 and focused on the recording surface of the CD.

The returned beam reflected at the recording surface of the CD or DVD is transmitted through the condenser lens 5 and transmission diffracted in the 1st order at the transmission type holographic optical element 4, and then it reaches the six-segment photodetector 7, 8. In reproduction of the DVD, the returned beam of the laser light at a wavelength of 635 nm impinges upon the six-segment photodetector 7, and in reproduction of the CD, the returned light of the laser light at a wavelength of 780 nm impinges upon the six-segment photodetector 8.

Figure 7:
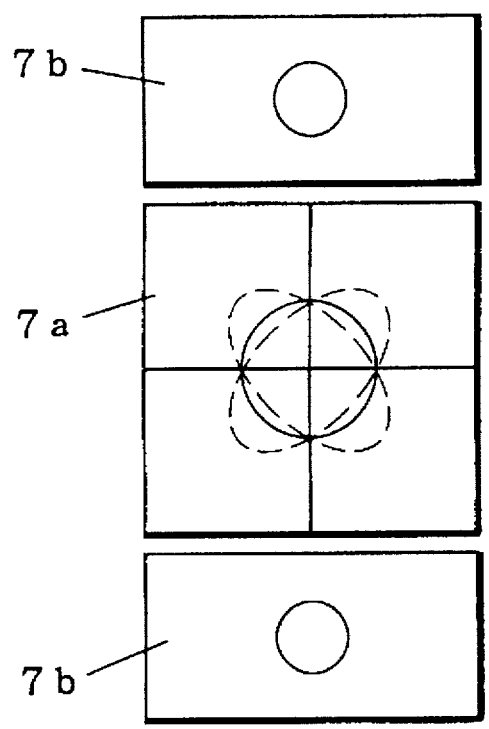
FIG. 7 is a schematic plan of the photodetector of the optical pickup apparatus.

As shown in FIG. 7, the six-segment photodetector 7 has a four-segment detecting portion 7a for detecting the reflected beam of the main spot and outputting a focus signal by the astigmatism and a reproduction signal and light detecting portions 7b, 7b for outputting a tracking error signal by the three-beam tracking method using the reflected beams of the sub-spots. The light detecting portions 7b, 7b are formed on each side of the four-segment light detecting portion 7a. The light detecting portions 7b, 7b independently detect the reflected beams of the sub-spots to output the tracking error signal corresponding to the difference in amount of the received light between the light detecting portions 7b, 7b caused by the tracking error of the main spot.

Figure 8:
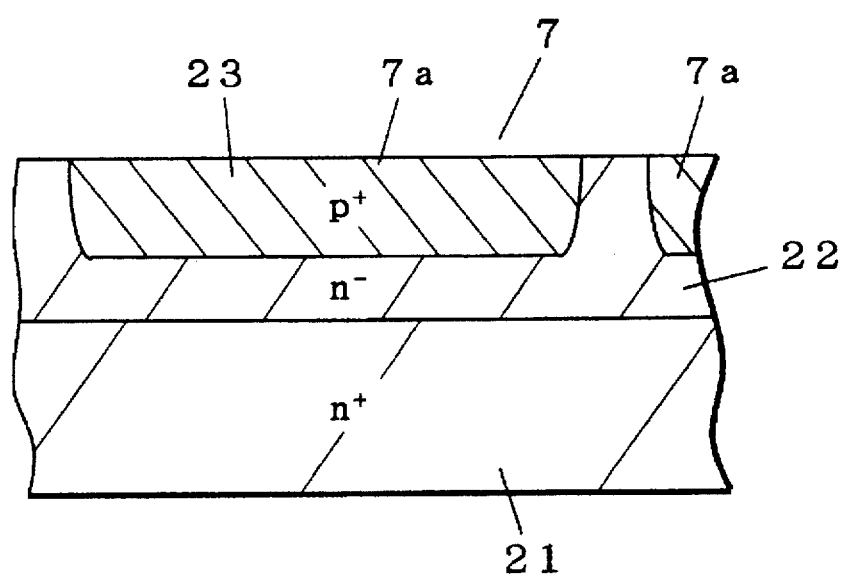
FIG. 8 is a fragmentary schematic sectional view of the six-segment photodetector used in this embodiment.

As shown in FIG. 8, this six-segment photodetector 7 is composed of a PIN type photodiode. The PIN photodiode includes an $n^+$-type Si substrate 21, an $n^-$-type semiconductor layer 22 formed on its surface, and $p^+$-type semiconductor regions 23 formed in correspondence with each segment of the four-segment light detecting portion 7a in the surface portion of the $n^-$-type semiconductor layer 22. The six-segment photodetector 8, formed similarly to the six-segment photodetector 7, detects the returned beams transmitted through the condenser lens 5 and the correction lens 6 and transmission diffracted in the 1st order at the transmission type holographic optical element 4.

This way, in the optical pickup apparatus of this embodiment, a laser light with short wavelength is emitted onto the recording surface of a DVD, a high-density information recording medium, and its reflected light is detected using the six-segment photodetector 7 for reproduction of the recorded information, and a laser light with long wavelength is emitted onto the recording surface of the CD and its reflected light is detected using the six-segment photodetector 8 for reproduction of the recorded information.

Furthermore, the transmission type holographic optical element 4 is formed so that the utilization efficiency of the short wavelength (635 nm) light is larger than that of the long wavelength (780 nm) light. This prevents a reduction of intensity of the returned beam with short wavelength. Hence, even if an Si system photodiode whose sensitivity deteriorates for short wavelength light is used as the six-segment photodetector 7, the returned beam of the short wavelength can be efficiently detected because the intensity of the returned beam of the short wavelength (635 nm) is sufficiently ensured.

While the long wavelength returned beam has a larger attenuation rate when transmitted through the holographic optical element 4 than the short wavelength returned beam, the Si system photodiode used for the six-segment photodetector 8 originally has sufficient sensitivity to light at such a wavelength as 780 nm. Hence, the long wavelength returned beam can also be detected sensitively in the six-segment photodetector 8. Accordingly, this optical pickup apparatus can accomplish excellent reproduction both with the DVD and the CD.

Figure 9:
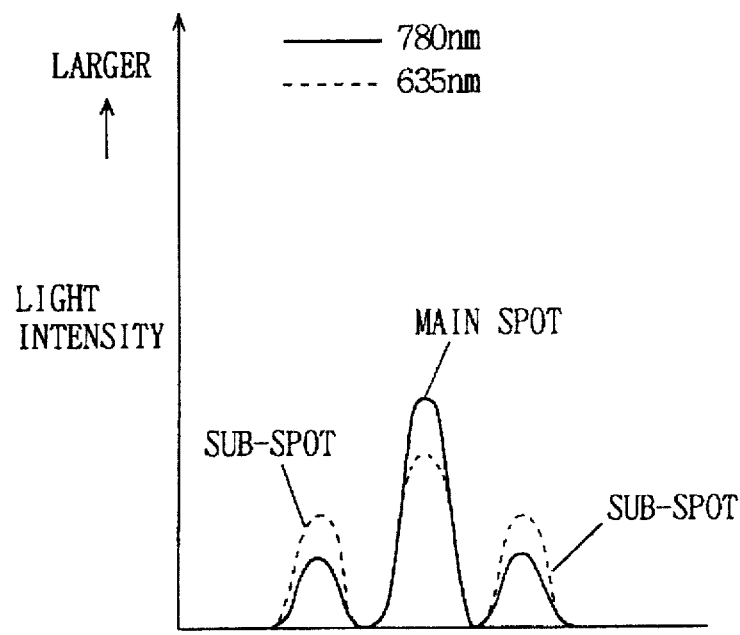
FIG. 9 is a schematic diagram showing the relation of intensities of the main spot and the sub-spots in the case of the wavelength of 780 nm and the wavelength of 635 nm in the optical pickup apparatus.

The three-beam generating diffraction grating 3 used in the optical pickup apparatus above is formed so that the diffraction efficiency of the main beam is small and the diffraction efficiency of the sub-beams is large. Accordingly, as shown in FIG. 9, the light intensity of the focused spots of the sub-beams on the recording surface of the CD or the DVD is larger in the DVD utilizing the short wavelength light than in the CD utilizing the long wavelength light. For example, with a wavelength of 635 nm, the intensity of the main spot with respect to the sub-spot is about 2 times, and with a wavelength of 780 nm, the intensity of the main spot with respect to the sub-spot is about 4 times.

Therefore, the use of the short wavelength (635 nm) light for reproduction of the DVD increases the intensity of the sub-spots because of the characteristics of the three-beam generating diffraction grating 3, leading to good S/N ratio of the tracking signal. This allows reproduction of the DVD with good tracking.

In the case of the CD having larger track width than the DVD, scan can be made with a large part of the sub-spots covering the track even if the long wavelength (780 nm) light is used, providing reproduction with good tracking.

While the first and second light sources in the above optical pickup apparatus can properly change the wavelength, the use of a semiconductor laser outputting light at a wavelength $\lambda_1$=620–660 nm and a semiconductor laser outputting light at a wavelength $\lambda_2$=765–800 nm allows reproduction of a CD and an information recording medium with track density about 1.5–3 times that of the CD with good tracking servo. In this case, it is preferred that (the intensity of the main spot)/(intensity of the sub-spot) is about 4–7 with the wavelength $\lambda_1$, and (the intensity of the main spot)/(intensity of the sub-spot) is about 2–3 with the wavelength $\lambda_2$.

Furthermore, the above three-beam generating diffraction grating 3 is available not only for an optical pickup apparatus having the transmission type holographic optical element but also for an optical pickup apparatus having another separating means such as a beam splitter instead of the transmission type holographic optical element used as the separating means for separating a returned beam.

Although the plurality of photodetectors (six-segment photodetectors 7, 8) are used in the embodiment above, one photodetector may be used in common for a plurality of information recording media with different recording densities.

Figure 10:
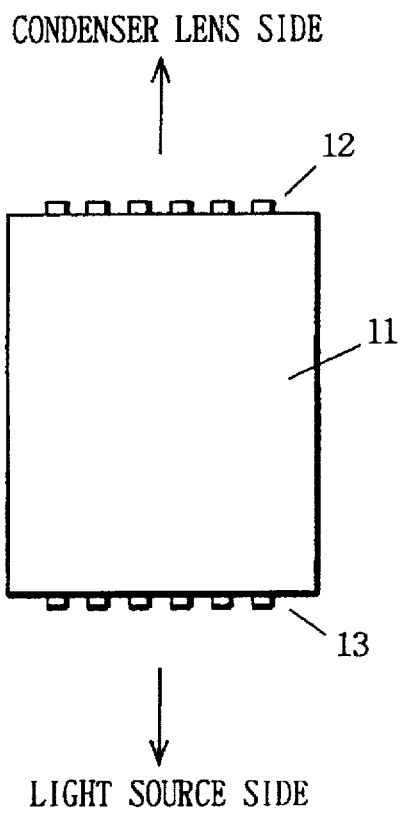
FIG. 10 is a schematic diagram showing an optical element having a three-beam generating diffraction grating surface and a holographic functional surface.

Furthermore, instead of the transmission type three-beam generating diffraction grating 3 and the transmission type holographic optical element 4 installed separately, an optical element including the two in one may be used. FIG. 10 shows its example. The optical element 11 shown in FIG. 10 is composed of a light-transmitting material, in which a three-beam generating diffraction grating surface 13 is formed in the surface facing to the first and second semiconductor lasers 1, 2 and a hologram surface 12 is formed in the surface facing to the condenser lens 5.

Figure 11:
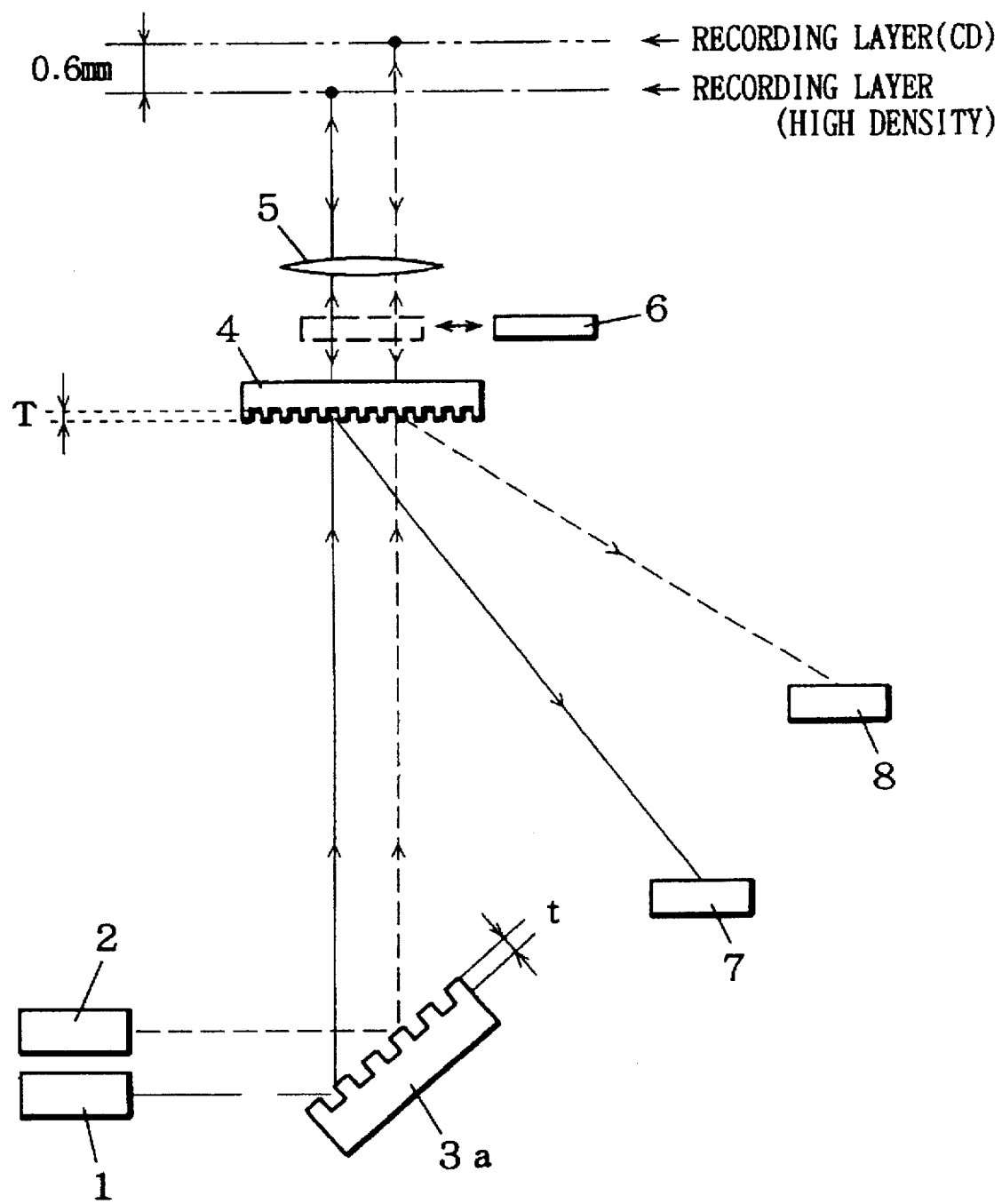
FIG. 11 is a schematic structural diagram of an optical pickup apparatus using a reflection type three-beam generating diffraction grating.
Figure 12:
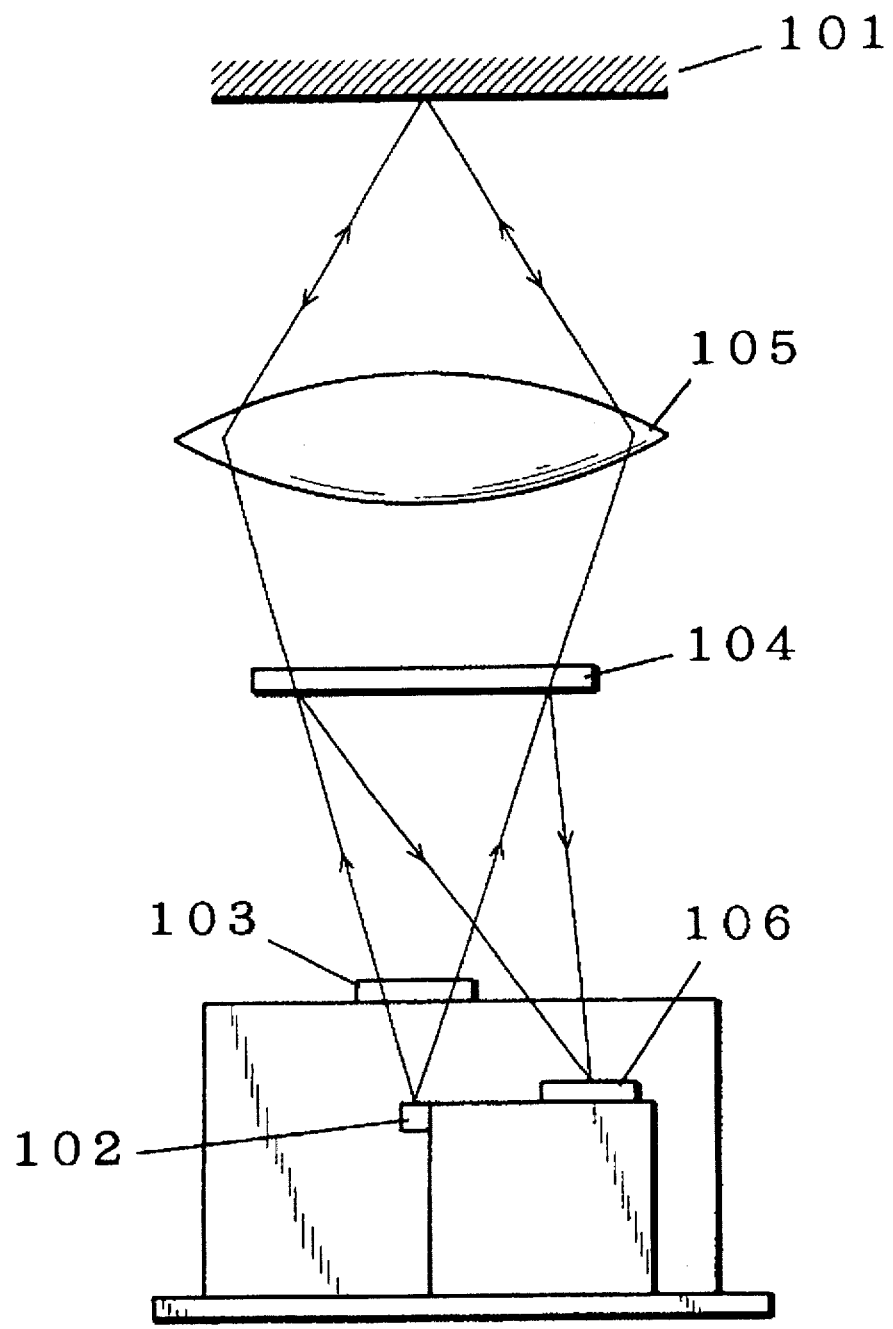
FIG. 12 is a schematic structural diagram of an optical pickup apparatus of a conventional example.
Figure 13:
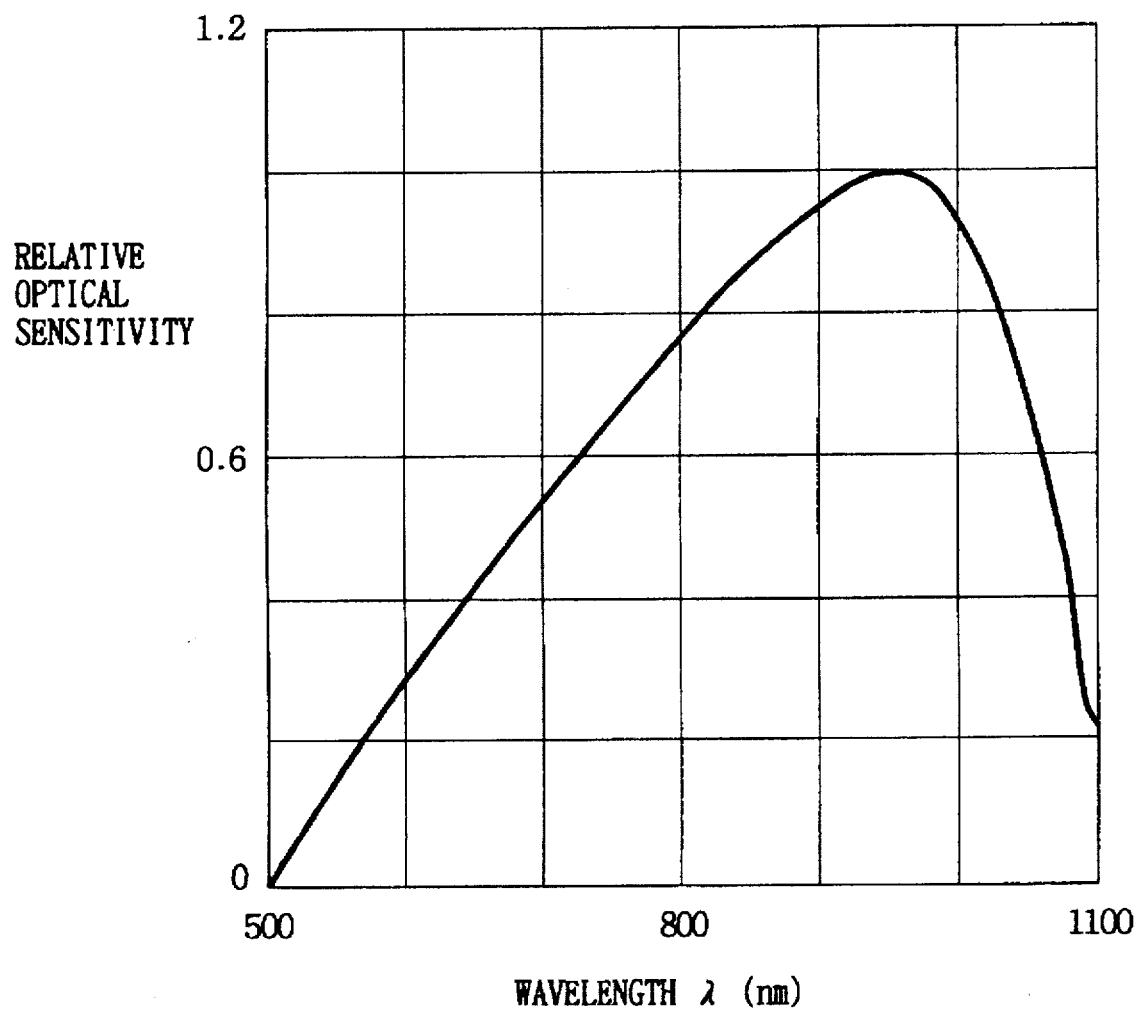
FIG. 13 is a diagram showing the relation of the relative optical sensitivity of the conventional Si system photodetector with respect to the wavelength.

Furthermore, although the embodiment above has been explained in the optical pickup apparatus using the transmission type three-beam generating diffraction grating, it can also be applied to an optical pickup apparatus which uses a reflection type three-beam generating diffraction grating 3a as shown in FIG. 11. It is also possible to bend the optical path with a reflecting means such as a mirror interposed between the transmission type holographic optical element and the information recording medium.

Moreover, the embodiment above has been described in an optical pickup apparatus capable of reproduction of a CD in which the distance from the transparent substrate surface on the side on which the reproduction light impinges (incidence surface) to the recording surface (reflection surface) is 1.2 mm thick and a high-density information recording medium (DVD) in which the distance from the transparent substrate surface on the side which the reproduction light hits (incidence surface) to the recording surface (reflection surface) is 0.6 mm thick and the track pitch is half that of the CD (pitch=1.6 μm), but it is also passible to reproduce information from a DVD in which the distance from the incidence surface to the recording surface is 1.2 mm, for example, and the present invention is also applicable to optical recording media with the incidence surfaces and the recording surfaces spaced at other distances.

Also, in the optical pickup apparatus having the transmission type holographic optical element of the invention, not only the tracking servo method by the three-beam method using a three-beam generating diffraction grating but also other tracking servo methods and focus servo methods other than the focus servo method by the astigmatism method can be used.

While the invention has been described in detail, the foregoing description is in all aspects illustrative and not restrictive. It is understood that numerous other modifications and variations can be devised without departing from the scope of the invention.

We claim:

1. A three-beam generating diffraction grating which divides an incident beam at least into a main beam and two sub-beams placed on both sides of said main beam, wherein said three-beam generating diffraction grating has the property that a diffraction efficiency of said main beam becomes smaller and a diffraction efficiency of said sub-beams becomes larger as a wavelength of said incident beam becomes shorter.

2. The three-beam generating diffraction grating according to claim 1, wherein said main beam is a 0th order diffraction light and said two sub-beams are a 1st order diffraction light and a −1st order diffraction light.

3. The three-beam generating diffraction grating according to claim 1, wherein a grating surface of said three-beam generating diffraction grating has a plurality of grooves having a depth set so that the diffraction efficiency of said main beam becomes smaller and the diffraction efficiency of said sub-beams becomes larger as the wavelength of said incident beam becomes shorter.

4. The three-beam generating diffraction grating according to claim 1, wherein said three-beam generating diffraction grating has the property that a diffraction efficiency of said main beam becomes smaller and a diffraction efficiency of said sub-beams becomes larger in the case where the wavelength of said incident beam is approximately between 620 and 660 nm than in the case where the wavelength of said incident beam is approximately between 765 and 800 nm.

5. An optical pickup apparatus, comprising:

a plurality of light sources which emit beams having wavelengths respectively corresponding to a plurality of information recording media with different kinds of track densities; and a three-beam generating diffraction grating provided in common for said plurality of light sources for dividing the beam emitted from each of said plurality of light sources at least into three beams including a main beam and two sub-beams for tracking servo placed on both sides of said main beam;

wherein said three-beam generating diffraction grating has the property that a diffraction efficiency of the divided main beam becomes smaller and a diffraction efficiency of the divided sub-beams becomes larger as the wavelength of an incident beam becomes shorter.

6. The optical pickup apparatus according to claim 5, further comprising:

a transmission type holographic optical element common to said plurality of light sources, which is disposed between said three-beam generating diffraction grating and an information recording medium in forward optical paths from said plurality of light sources for obtaining from a returned beam from said information recording medium a separated diffraction beam separated from corresponding one of said forward optical paths; and a photodetector for detecting the separated diffraction beam given off from said transmission type holographic optical element;

wherein said transmission type holographic optical element has the property that a product of a diffraction efficiency for a beam in a forward optical path transmitted through said transmission type holographic optical element and a diffraction efficiency for said separated diffraction beam becomes larger as the wavelength of the light incident in said forward optical path becomes shorter.

7. The optical pickup apparatus according to claim 5, further comprising:

a collector for collecting said three beams given off from said three-beam generating diffraction grating onto the information recording medium;

a separator for transmitting said three beams and separating from said three beams returned beams from said information recording medium; and a photodetector for detecting said returned beams given off from said separator.

8. The optical pickup apparatus according to claim 7, further comprising an optical element disposed in forward optical paths between said light sources and said collector, wherein said three-beam generating diffraction grating and said separator are formed on planes facing each other in said optical element.

9. The optical pickup apparatus according to claim 5, wherein said main beam divided by said three-beam generating diffraction grating is a 0th order diffraction light and said two sub-beams are a 1st order diffraction light and a −1st order diffraction light.

10. The optical pickup apparatus according to claim 5, wherein a grating surface of said three-beam generating diffraction grating has a plurality of grooves having a depth set so that the diffraction efficiency of said divided main beam becomes smaller and the diffraction efficiency of said divided sub-beams becomes larger as the wavelength of said incident beam becomes shorter.

11. The optical pickup apparatus according to claim 5, wherein said plurality of light sources includes a first light source which emits a light having a first wavelength for reproduction of a first information recording medium and a second light source which emits a light having a second wavelength longer than said first wavelength for reproduction of a second information recording medium with a lower recording density than that of said first information recording medium, and said three-beam generating diffraction grating has the property that a diffraction efficiency of said main beam becomes smaller and a diffraction efficiency of said sub-beams becomes larger in the case of said first wavelength than in the case of said second wavelength.

12. The optical pickup apparatus according to claim 11, wherein said first light source is a semiconductor laser which emits a beam having a wavelength approximately between 620 and 660 nm and said second light source is a semiconductor laser which emits a beam having a wavelength approximately between 765 and 800 nm.

13. The optical pickup apparatus according to claim 5, wherein said three-beam generating diffraction grating is a transmission type three-beam generating diffraction grating.

14. The optical pickup apparatus according to claim 5, wherein said three-beam generating diffraction grating is a reflection type three-beam generating diffraction grating.

15. A transmission type holographic optical element used to obtain a separated diffraction beam in a first diffraction order separated from an incident beam, wherein said transmission type holographic optical element has the property that a product of a diffraction efficiency for said separated diffraction beam in said first diffraction order and a diffraction efficiency for a diffraction beam in a second diffraction order different from the diffraction order of said separated diffraction beam becomes larger as a wavelength of said incident beam becomes shorter.

16. The transmission type holographic optical element according to claim 15, wherein said separated diffraction beam is a 1st order diffraction beam or a −1st order diffraction beam and said diffraction beam of said second diffraction order is a 0th order diffraction beam.

17. The transmission type holographic optical element according to claim 15, wherein a holographic functional surface of said transmission type holographic optical element has a plurality of grooves having a depth set so that the product of the diffraction efficiency for said separated diffraction beam and the diffraction efficiency for the diffraction beam in said second diffraction order becomes larger as the wavelength of said incident beam becomes shorter.

18. The transmission type holographic optical element according to claim 15, wherein said transmission type holographic optical element has the property that the product of the diffraction efficiency for said separated diffraction beam and the diffraction efficiency for the diffraction beam in said second diffraction order in the case where the wavelength of said incident beam is approximately between 620 and 660 nm is larger than the product of the diffraction efficiency for said separated diffraction beam and the diffraction efficiency for the diffraction beam in said second diffraction order in the case where the wavelength of said incident beam is approximately between 765 and 800 nm.

19. An optical pickup apparatus capable of reproduction of a plurality of different information recording media, comprising:
  a plurality of light sources for emitting lights having wavelengths respectively corresponding to said plurality of information recording media having different recording densities; and
  a transmission type holographic optical element common to said plurality of light sources, which is disposed in forward optical paths from said plurality of light sources for obtaining from a returned beam from an information recording medium a separated diffraction beam separated from corresponding one of said forward optical paths;
  wherein said transmission type holographic optical element has the property that a product of a diffraction efficiency for a beam in a forward optical path transmitted through said transmission type holographic optical element and a diffraction efficiency for said separated diffraction beam becomes larger as a wavelength of an incident light in said forward optical path becomes shorter.

20. The optical pickup apparatus according to claim 19, further comprising:
  a three-beam generating diffraction grating common to said plurality of light sources disposed in the forward optical paths between said plurality of light sources and said transmission type holographic optical element for dividing the beam emitted from each of said plurality of light sources at least into three-beams including a main beam and two sub-beams for tracking servo placed on both sides of said main beam;
  wherein said three-beam generating diffraction grating has the property that a diffraction efficiency of the divided main beam becomes smaller and a diffraction efficiency of the divided sub-beams becomes larger as the wavelength of the incident beam becomes shorter.

21. The optical pickup apparatus according to claim 19, further comprising a three-beam generating diffraction grating between said plurality of light sources and said holographic optical element in said forward optical path.

22. The optical pickup apparatus according to claim 21, wherein said transmission type holographic optical element and said three-beam generating diffraction grating are integrally formed of a light-transmitting member, said light-transmitting member having a holographic functional surface and a three-beam generating diffraction grating surface facing each other, said three-beam generating diffraction grating surface being disposed on the side of said plurality of light sources.

23. The optical pickup apparatus according to claim 19, wherein the beam passing through said transmission type holographic optical element in said forward optical path is a 0th order diffraction light and said separated diffraction beam is a 1st order diffraction light or a −1st order diffraction light.

24. The optical pickup apparatus according to claim 19, wherein said plurality of light sources include a first light source which emits a light having a first wavelength for reproduction of a first information recording medium and a second light source which emits a light having a second wavelength longer than said first wavelength for reproduction of a second information recording medium with a lower recording density than that of said first information recording medium, and
  said transmission type holographic optical element has the property that a product of a diffraction efficiency for a beam which is the light emitted from said first light source and transmitted through said transmission type holographic optical element in said forward optical path and a diffraction efficiency for a separated diffraction beam separated from said corresponding forward optical path obtained from a returned beam from said first information recording medium is larger than a product of a diffraction efficiency for a beam which is the light emitted from said second light source and transmitted through said transmission type holographic optical element in said forward optical path and a diffraction efficiency for a separated diffraction beam separated from said corresponding forward optical path obtained from a returned beam from said second information recording medium.

25. The optical pickup apparatus according to claim 24, wherein said first light source is a semiconductor laser which emits a light having a wavelength approximately between 620 and 660 nm and said second light source is a semiconductor laser which emits a light having a wavelength approximately between 765 and 800 nm.

26. The optical pickup apparatus according to claim 19, further comprising:
  a collector disposed between said transmission type holographic optical element and said plurality of information recording media for collecting each of the beams emitted from said plurality of light sources onto corresponding one of said information recording media; and
  at least one detector for detecting the separated diffraction beam given off from said transmission type holographic optical element.

27. The optical pickup apparatus according to claim 19, wherein a holographic functional surface of the transmission type holographic optical element has a plurality of grooves having a depth set so that a product of a diffraction efficiency for a beam transmitted through said transmission type holographic optical element in said forward optical path and a diffraction efficiency for said separated diffraction beam becomes larger as the wavelength of the incident light in said forward optical path becomes shorter.

* * * * *